United States Patent [19]

Heyes et al.

[11] 3,821,415

[45] June 28, 1974

[54] HETEROCYCLIC COMPOUNDS IN PHARMACEUTICAL COMPOSITIONS AND METHODS

[75] Inventors: James Heyes, Peaslake; Neal Ward, Tadworth, both of England

[73] Assignee: Beecham Group Limited,, Brentford, Middlesex, England

[22] Filed: Mar. 31, 1972

[21] Appl. No.: 240,250

Related U.S. Application Data

[62] Division of Ser. No. 174,253, Aug. 23, 1971, Pat. No. 3,772,319.

[30] Foreign Application Priority Data

Aug. 27, 1970  Great Britain.................... 41261/70

[52] U.S. Cl. ............................................... 424/273
[51] Int. Cl. ............................................ A61k 27/00
[58] Field of Search ................................... 424/273

[56] References Cited
FOREIGN PATENTS OR APPLICATIONS

| | | | |
|---|---|---|---|
| 683,523 | 12/1952 | Great Britain...................... | 260/309 |
| 683,593 | 12/1952 | Great Britain...................... | 260/309 |
| 683,594 | 12/1952 | Great Britain...................... | 260/309 |

OTHER PUBLICATIONS

Bader et al., J. Chem. Soc. (London), 1950, pp. 2775--2781.
Cook et al., I. J. Chem. Soc. (London), 1950, pp. 1071-1074.
Cook et al. II. J. Chem. Soc. (London), 1950, pp. 1884-1888.

*Primary Examiner*—Stanley J. Friedman

[57] ABSTRACT

Pharmaceutical compositions which are useful for producing anti-inflammatory and analgesic effects are produced which comprise a compound of the formula:

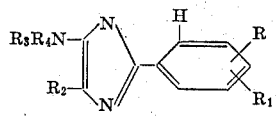

wherein R and $R_1$ are each hydrogen, halogen, a carboxylic acid group or an ester or amide thereof, nitro, trifluoromethyl unsubstituted or substituted alkyl of one to four carbon atoms, aryl, hydroxy or an etherified or esterified derivative thereof, a primary or secondary amino or an acyl derivative thereof, or tertiary amino; $R_2$ is an amide, carboxylic acid group or an unsubstituted or substituted ester or aryl; $R_3$ and $R_4$ are each hydrogen or alkyl, or a tautomer thereof, an acid addition salt thereof, a hydrate thereof or a hydrated acid addition salt thereof, in combination with a pharmaceutically acceptable diluent, carrier or excipient.

11 Claims, No Drawings

HETEROCYCLIC COMPOUNDS IN PHARMACEUTICAL COMPOSITIONS AND METHODS

This is a division of application Ser. No. 174,253 filed Aug. 23, 1971, now U.S. Pat. No. 3,772,319.

This invention relates to novel anti-inflammatory and/or analgesic pharmaceutical compositions and to novel imidazole derivatives, a process for their production and certain novel intermediates.

For many years, acetyl salicyclic acid and its salts have been used as anti-inflammatories and analgesic agents. However, the desire for more powerful agents and agents that do not irritate the stomach has lead to the use of certain steroids for these purposes. Many steroids have a powerful anti-inflammatory action, which in general is of a different nature than that of acetyl salicyclic acid. However, shortly after the introduction of steroids it was realized that such compounds produced many unfortunate side effects. This was, of course, not entirely unexpected because of their close relationship to naturally occurring hormones. Some synthetic steroids have been produced that have reduced side effects but none are entirely satisfactory. It is desirable, therefore, to find new anti-inflammatory and/or analgesic compounds of a non-steroidal structure that have similar beneficial effects to those of steroids, but are free from their disadvantages.

It has now been found that certain substituted imidazoles have such activity, and surprisingly certain of these compounds have been shown to be useful as anthelmintics.

The presence of this biological activity is especially surprising since certain compounds of somewhat similar structure have previously been prepared but have been reported to be biologically inactive. These other compounds were disclosed in British Pat. Specification Nos. 683,523, 683,593 and 683,594 and by Bader et al. in J. Chem. Soc., 1950, 2775–2784. The imidazoles reported in the above-mentioned British patent specifications were prepared as intermediates in the synthesis of purines and were not reported to have any activity while Bader et al. produced their imidazoles in search of "new drugs" (page 2775) and went so far as to state that their compounds were found to "possess little or no activity" (page 2776).

Accordingly, the present invention provides a pharmaceutical composition comprising an imidazole of the general Formula (I):

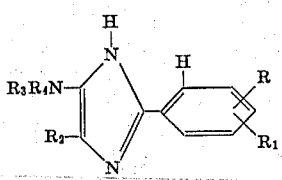

wherein R and $R_1$ are each a hydrogen or halogen atom, a carboxylic acid group or an ester or amide thereof, a nitro, trifluoromethyl, an optionally substituted alkyl of one to four carbon atoms or aryl group, a hydroxyl group or an etherified or esterified derivative thereof, or a primary or secondary amino group or an acyl derivative thereof, or a tertrary amino group; $R_2$ is an amide group, a carboxylic acid group or an optionally substituted ester or aryl group; and $R_3$ and $R_4$ are each a hydrogen atom or an alkyl group or a tautomeric form thereof or an acid addition salt thereof, together with one or more active compounds and/or carriers, diluents or excipients.

Suitably, one or both of R and $R_1$ is a hydrogen or halogen atom, or an optionally acylated or alkylated amino or hydroxy group. Preferred values for R and $R_1$ include hydrogen, fluorine, chlorine, bromine atoms, hydroxy methoxy and amino groups. If either R or $R_1$ is other than a hydrogen, a preferred position of substitution is the 4-position.

Suitable values for $R_2$ include optionally substituted phenyl groups, the amide group or optionally substituted ester groups such as aliphatic esters of one to seven carbon atoms such as methoxycarbonyl, ethoxycarbonyl, butoxycarbonyl, and benzyloxycarbonyl and the like, any of which may be substituted by a halogen atom, an alkoxy or amino group or the like.

Preferred values for $R_2$ include the phenyl, amide and carbethoxy group.

$R_3$ is preferably a hydrogen atom but in general activity is retained if $R_3$ is an alkyl group. $R_4$ is preferably a hydrogen atom or if $R_3$ is an alkyl group, $R_4$ is preferably the same alkyl group.

In general, it has been found that those compounds in which $R_2$ is an amide or ester group tend to be anti-inflammatories and $R_2$ is an amide or ester group tend to be anti-inflammatories and at higher dosages also show analgesic activity, while those in which $R_2$ is a phenyl group tend to be analgesics with less important anti-inflammatory properties.

The active compound may be present in the formulation as a salt or the free base, either of which may be hydrated. Often the active compound is preferred in the form of a salt as these tend to be generally more crystalline, easier to purify and tend to be of greater stability. Any pharmaceutically acceptable organic or inorganic acid may be used such as hydrochloric, hydrobromic, sulphuric, acetic, tartaric, lactic, citric and the like. Hydrates are most likely to be used where they are formed during process of production of the active compound but only when they do not have many undesirable properties.

The compositions of the invention may be administered orally, parenterally or by suppository. Typical oral formulations include pills, tablets, capsules, sachets, granules, powders, chewing-gum, suspensions, emulsions and solutions: particularly preferred oral formulations are tablets and capsules. Where appropriate and where necessary the formulations may include diluents, binding agents, dispersing agents, surface-active agents, lubricating agents, coating materials, flavoring agents, coloring agents, solvents, thickening agents, suspending agents, sweeteners or any other pharmaceutically acceptable additives, for example gelatin, lactose, starch, talc, magnesium stearate, hydrogenated oils, polyglycols and syrups. Where the formulations are tablets or capsules and the like they will represent pre-measured unit doses but in the case of granules, powders, suspensions and the like the formulations may be presented as pre-measured doses or in multi-dose containers from which the appropriate unit dose may be withdrawn.

The injectable form may generally be an aqueous solution (although non-aqueous solution may be used if required), suspension, or emulsion in a pharmaceutically acceptable liquid (e.g., sterile pyrogen-free water or parenterally acceptable oils) or mixture of liquids which may contain bacteriostatic agents, anti-oxidants or other preservatives, buffers, (preferably in the physiological pH range of 6.5 – 7.0), solutes to render the solution isotonic with the blood, thickening agents, suspending agents or other pharmaceutically acceptable additives. Such forms will be presented in unit dose form such as ampoules or disposable injection devices or in multi-does forms such as a bottle from which the appropriate dose may be withdrawn, or as a solid form or concentrate which can be used to quickly prepare an injectable formulation. All formulations for injection are preferably rendered sterile.

Suppositories containing the compound will also contain suitable carriers (e.g., cocoa-butter or polyglycols).

In addition to standard pharmaceutical additives there may be included within formulations of the compound other therepeutic agents, particularly including other anti-inflammatories or analgesics (for example, acetyl salicyclic acid).

The compositions of the invention exhibit an anti-inflammatory action more akin to that of certain steroids than to that of acetyl salicyclic acid. For example in the "Mouse Ear Test" (see Example 54) acetyl salicyclic acid is able to inhibit the increase of ear weight by a maximum of about 45 percent whereas hydrocortisone and certain compounds of general formula (I) are able to inhibit the increase of ear weight by up to 85 percent. This cannot be due to the compound of the invention causing in vivo production of hydrocortisone as a similar effect is observed in adrenolectomized animals. The "Cotton Pellet Granuloma Test" also indicates that the compounds of the invention act in a manner different than that of acetylsalicyclic acid (see Example 55).

A further advantage of the formulation of the invention is that they do not cause stomach irritation at effective dosages.

In general a suitable single dosage range is from 0.1 – 100 mg/kg bodyweight, preferably 1 – 50 mg/kg. One or more doses per day may be taken so that for a 70 kg adult the daily dose may be from, for example, 7 – 10,000 mgs., generally from 20 – 7,000 mgs, preferably from 50 – 5,000 mgs.

Certain of the compounds of the invention are novel, accordingly in a second aspect the invention provides imidazoles of general Formula (II):

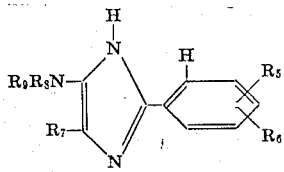

wherein $R_5$ and $R_6$ are each a hydrogen or halogen atom, a nitro, trifluoromethyl, carboxylic acid, amide or ester group, or an optionally substituted hydroxyl or amino group, alkyl of one to four carbon atoms or phenyl group; $R_7$ is an amide or carboxyl group or an optionally substituted hydroxy substituted ester or phenyl group; and $R_8$ and $R_9$ are each a hydrogen atom or alkyl group except that when $R_7$ is phenyl $R_5$ must not be H when $R_6$ is H, p-Cl, p-$NO_2$ or p-$NH_2$ and $R_5$ must not be 4-$OCH_3$ when $R_6$ is 3-$OCH_3$; and when $R_7$ is carbethoxy, $R_5$ and $R_6$ must not both be H or both be $OCH_3$ or a tautomeric form thereof or an acid addition salt, hydrate or hydrated acid addition salt thereof.

Preferred groups $R_5$ include the fluorine, chlorine or bromine atoms, the hydroxy, methoxy, ethoxy, benzyloxy, amino and $C_{1-4}$ alkyl groups especially when in the p-position.

Preferred groups $R_6$ include the hydrogen, fluorine, chlorine, bromine atoms or the hydroxy and methoxy groups, the hydrogen atom being especially preferred.

Suitable values for $R_7$ include the amide group, the optionally substituted phenyl group or a carboxylic group esterified by an alkyl, aralkyl or aryl group each of which may be optionally substituted by a halogen atom or hydroxy or amino or substituted hydroxy or amino group.

Preferred values for the group $R_7$ include the amide, phenyl and the carboxylic group esterified by an alkyl group containing from one to six carbon atoms, a benzyl group or a phenyl group.

Preferred esterifying alkyl groups include ethyl, propyl, butyl, benzyl and like groups.

The preferred values for $R_8$ and $R_9$ are hydrogen atoms or methyl groups.

These novel compounds are useful as pharmaceuticals as explained above and also as intermediates in the synthesis of other pharmaceutically useful imidazoles which exhibit anti-viral, anti-inflammatory and anti-tumour activity.

In a further aspect the invention provides a process for the preparation of compounds of general Formula (II). This process is similar to that described in British Pat. Specification Nos. 683,523, 683,593 and 683,594 and comprises reacting a nitrile of Formula (III):

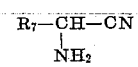

with a compound of general Formula (IV):

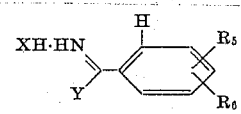

wherein Y is a group very readily displaced by a nucleophilic displacement and HX represents a mole of acid preferably present to salt the amino group. Suitable groups Y include $ZCH_3$, $ZC_2H_5$, $ZCH_2Ph$ and the like wherein Z is O or S, preferably S. The preferred group Y is the benzylthio group $PhCh_2S$. The initially formed salt of the compound of Formula (II) may, if required, be converted to the free base by treatment with an alkaline reagent; the resulting free base may be converted to any desired acid-addition salt by treatment with acid.

Similarly $R_8$ and $R_9$, when H, may be converted to alternative groups by standard techniques of alkylation.

The condensation reaction of the invention is generally effected in an inert solvent. Suitable solvents include one or more halogenated hydrocarbons such as chloroform, carbon tetrachloride, methylene chloride or methylene bromide, alcohols such as methanol, ethanol, hexanol and the like, ethers such as tetrahydrofuran and like solvents, or aromatic hydrocarbons such as benzene or toluene. When $R_7$ is an ester or phenyl group the preferred solvents are chlorinated hydrocarbons, especially chloroform. When $R_7$ is the carboxamide group, the preferred solvents are alcohols, especially ethanol.

The reaction may be carried out at low, ambient or high temperatures, for example, from 0°– 150°C. It has been found, however, that a particularly suitable temperature range for the reaction is from 50°– 100°C. This may often be achieved by selecting a solvent that refluxes within this range, for example, chloroform or tetrahydrofuran.

Certain of the compounds of general Formula (IV) are themselves novel.

Thus, in a further aspect of the invention are provided acid addition salts of compounds of general Formula (V):

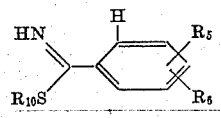

wherein $R_5$ and $R_6$ are as previously defined and $R_{10}$ is a $C_{1-4}$ alkyl group, or benzyl group except that when $R_5$ is hydrogen $R_6$ must not be H, p-Cl or p-$NO_2$ and when $R_5$ is 4-$OCH_3$, $R_6$ must not be 3-$OCH_3$.

The preferred value for $R_{10}$ is the benzyl group.

The preferred salts are those with inorganic acids such as hydrochloric or hydrobromic acid.

The invention also provides a process for the production of compounds of Formula (V) which process comprises the reaction of a thiol $R_{10}SH$ with a nitrile of general Formula (VI):

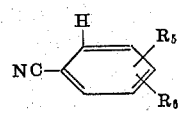

said process taking place in solution in the presence of an acid.

Suitable solvents include ethers such as diethyl ether, dioxane, tetrahydrofuran and the like. A preferred solvent is anhydrous diethyl ether.

In general the reaction will be carried out at a depressed temperature, for example, below 10°C, for example, 0°C, and may frequently require long periods for the production of high yields of product.

It is well known (Chem. Revs. 61 179–211 (1961)) that the iminoether synthesis may fail when a substituent is ortho - to the nitrile group. Surprisingly it has been found that compounds of formula VI may be prepared with $R_6$ = H, and $R_9$ = 2-fluoro, 2-chloro, 2-methyl and the like, provided that a sufficiently long reaction time is employed.

It is apparent that imidazoles of formula II wherein $R_6$ or $R_7$ are amino, hydroxy, or other reactive groups, are best prepared via the iminoether containing the reactive group protected as a suitable derivative.

The following examples serve to illustrate the invention.

EXAMPLE 1

4-Fluorophenylformamino/benzyl thioether p-Fluorophenylnitrile (0.10 mole), benzyl mercaptan (0.17 mole) and dry dioxan (100 mls) were cooled to 0°C. Dry hydrogen chloride was slowly passed into the mixture for 3 hours and the dry mixture kept at room temperature for 3 days. Addition of dry diethyl ether (500 mls.) was added and a resulting crystalline precipitate was filtered off and washed well with diethyl ether to give 4-fluorophenylformamino benzyl thioether hydrochloride (0.09 mls, 90 percent) m.p. 160°– 162°C.

EXAMPLES 2 – 7

Compounds of formula

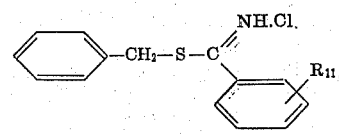

were made by a process analogous to that described in Example 1.

| Example | $R_{11}$ | M.pt.°C. | |
|---|---|---|---|
| 2 | 4-$CF_3$ | 200 | (decomposed) |
| 3 | 4-$CO_2H$ | 180 | do. |
| 4 | 3-F | 153–4 | do. |
| 5 | 3-$CH_3$ | 155–6 | |
| 6 | 4-Ph | 150 | do. |
| 7 | 4-$CO_2C_2H_5$ | 137–9 | do. |

EXAMPLE 8

5-Amino-4-carbethoxy 2-(4'-fluorophenyl) imidazole

4-Fluorophenylformamino benzyl thioether hydrochloride (29.0 gm) was refluxed in chloroform (200 ml) with ethyl amino-cyanoacetate (17.0 gm) for 1 hour. On standing for 8 hours the addition of dry diethyl ether (250 ml) caused the precipitation of the hydrochloride salt of 5-amino-4-carbethoxy 2-(4'-fluorophenyl) imidazole. (25.0 gm, 85 percent), m.p. 161°– 2°C after recrystallization from ethanol. Treatment of this salt with squeous sodium carbonate gave the free base, m.p 246°– 7°C.

EXAMPLES 9 – 36

Compounds of structure (VIII) were prepared by the method of Example 8.

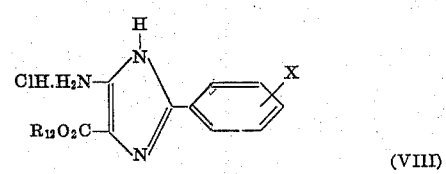

(VIII)

| Example No. | $R_{12}$ | X | m.pt.°C |
|---|---|---|---|
| 9 | $C_2H_5$ | H | 228 |
| 10 | do. | 2-F | 158-9* |
| 11 | do. | 3-F | 212 |
| 12 | do. | 2-Cl | 149* |
| 13 | do. | 3-Cl | 244* |
| 14 | do. | 4-$OCH_3$ | 203-4* |
| 15 | do. | 4-$CH_3$ | 158-161 |
| 16 | do. | 4-$nC_4H_9$ | 133-4 |
| 17 | do. | 4-$NO_2$ | 277 |

-Continued

| Example No. | $R_{12}$ | X | m.pt.°C |
| --- | --- | --- | --- |
| 18 | do. | 4-Br | 247-9* |
| 19 | do. | 4-$CF_3$ | 231-3 |
| 20 | $C_2H_5$ | 4-$CO_2H$ | 250 |
| 21 | do. | 4-$OCH_2C_6H_5$ | 102-3 |
| 22 | do. | 3-$CH_3$ | 136 |
| 23 | do. | 4-$C_6H_5$ | 225 |
| 24 | do. | 4-$CO_2C_2H_5$ | |
| 25 | $CH_3$ | 4-Cl | 208 |
| 26 | do. | H | 200-2* |
| 27 | $C_3H_7{}^i$ | H | 203-4* |
| 28 | $C_3H_7{}^n$ | H | 211-3* |
| 29 | $C_4H_9{}^n$ | H | 208-9* |
| 30 | $C_4H_9{}^i$ | H | 239-241* |
| 31 | $C_4H_9{}^t$ | H | 222-4* |
| 32 | $C_6H_{13}{}^n$ | H | 188-9* |
| 33 | $CH_2C_6H_5$ | H | 185-7* |
| 34 | $CH_3$ | H | 173-4* |
| 35 | $C_2H_5$ | 4-Cl | 177-8 |
| 36 | $CH_3$ | 4-F | 210 |

(* m.pt refers to free base and not to the hydrochloride salt)

EXAMPLE 37

5-Amino-4-carbethoxy 2-(3′.4′-dimethoxy phenyl) imidazole (m p 198°–9°C) and its hydrochloride were prepared in a manner analogous to that described in Example 8 (m p 222–224°C)

EXAMPLE 38

5-Amino-4-phenyl-2-(4′-fluorophenyl) imidazole (m p 190°C) was prepared in a manner analogous to that described in Example 8, the ethylaminocyano acetate being replaced by α-amino benzyl cyanide.

EXAMPLE 39

5-Amino-4-carboxamide-2-phenyl imidazole hydrochloride (m p 300°C was prepared in a manner analogous to that described in Example 8, except that amino cyanoacetamide was used instead of ethylamino cyano acetate, and ethanol was used as solvent.

EXAMPLE 40

5(4)-Amino-4(5)-amido-(4′-fluorophenyl) imidazole hydrochloride (m.p 300°C) was prepared in a manner analogous to that described in Example 39.

EXAMPLE 41

5-Amino-4-(4′-methoxyphenyl)-2-phenyl imidazole hydrochloride (m.p 285°C) was prepared in a manner analgous to that described in Example 38, except that α-amino-4-methoxybenzyl cyanide was used instead of α-aminobenzyl cyanide.

EXAMPLE 42

5-Dimethylamino-4-carbethoxy-2-(4′-fluorophenyl)imidazole 5-Amino-4-carbethoxy-2(4′-fluorophenyl) imidazole (500 mg ) in methanol (100 ml) and formalin (2 ml) was shaken under hydrogen in the presence of 10 percent palladium/charcoal. Filtration and evaporation gave 5(4)-dimethylamino-4(5)-carbethoxy-2-(4′-fluorophenyl) imidazole, (218 mg, 45 percent), m.p. ex. methanol/ether, 194°C.

EXAMPLE 43

5-Diethylamino-4-carbethoxy-2-(4′-fluorophenyl) imidazole (m.p 144°C) was prepared in a manner analogous to that of Example 42, except that acetaldehyde was used instead of formalin.

EXAMPLE 44

5-Amino-4-carbobenzoxy-2-(4′-fluorophenyl) imidazole hydrochloride Benzylaminocyanoacetate (20 g.) and 4-fluorophenylformamino benzyl thioethyl (12 g) were refluxed in chloroform (100 ml) for 3 hours. The mixture was poured into ether and the resulting solid filtered off and washed with sodium carbonate solution. The resulting free base was filtered off and dissolved in ethanolic HCl. The resulting solution was evaporated under reduced pressure and the product recrystallized from ethanol to yield 5-amino-4-carbobenzoxy-2-(4′-fluorophenyl) imidazole hydrochloride (7g) m.p 189°.

EXAMPLE 45

5-Amino-4-carboxy-2-(4′-fluorophenyl) imidazole hydrochloride 5(4)-Amino-4(5)-carbobenzoxy-2-(9′-fluorophenyl) imidazole hydrochloride (400 mg.) was shaken in aqueous methanol containing 10 percent palladium/charcoal under an atmosphere of hydrogen. The solids were filtered off and the liquid evaporated to yield a colorless compound. Recrystallization from ethanol/ether gave 5-amino-4-carboxy-2-(4′-fluorophenyl) imidazole hydrochloride (115 mg), m.p. 200°C with decomposition.

EXAMPLE 46

5-Amino-4-phenyl-2-(4-chlorophenyl) imidazole hydrochloride
was prepared by a method analogous to that of Example 38 (percent yield = 90; m.p. = 260°C).

EXAMPLE 47

5-Amino-4-carbethoxy-2-(4-hydroxyphenyl) imidazole
5-Amino-4-carbethoxyl-2-(4-benzyloxyphenyl) imidazole hydrochloride (2 g) in methanol (100 ml) was shaken with 10 percent palladium/charcoal under an atmosphere of hydrogen. When no more hydrogen was taken up the solution was filtered and the solvent evaporated under low pressure. Recrystallization from methanol/ether gave 5-amino-4-carbethoxy-2-(4-hydroxyphenyl) imidazole as the hydrochloride (1.1 g), m.p. 249°C.

EXAMPLE 48

5-Amino-2-(4′-aminophenyl)-4-carbethoxy imidazole dihydrochloride monohydrate
The nitro-compound of Example 17 (20.0 gm), stannous chloride (50 gm) and conc. hydrochloric acid (120 ml) were stirred at 5°C for 3 hours, and allowed to stand overnight at room temperature. The insoluble solid was filtered off and discarded. The filtrate was evaporated to dryness, the residue taken up in water (400 ml) and the tin removed with $H_2S$. The tin sulphide was filtered and the filtrate evaporated to dryness. Yield 14.75 gm. (72 percent). It was purified by recrystallization from dilute hydrochloric acid mp. 255°–6°.

EXAMPLE 49

2-chlorobenzonitrile (50 gm), benzyl mercaptan (60 gm) and dry dioxan (50 ml) were cooled to 0°C and dry hydrogen chloride passed into the solution until it was saturated. The mixture was sealed to exclude moisture and allowed to stand for 15 days. Dry diethyl ether (500 mls) was then added and the crystalline precipitate collected, washed with dry diethyl ether to give 2-chlorophenyl formamino benzyl thioether hydrochloride, 18 5 gm (17 percent) mp 177°–8°C.

EXAMPLE 50

Compound 8 and also separately several of the compounds of Examples 9 – 51 were made into tablets containing approximately 100 mg. of active ingredient. The following table gives the compositions of the tablets.

FORMULATION FOR PRODUCTION OF 10,000 TABLETS (APPROXIMATELY 2,000 GMS)

Active ingredient — 1,000 grams
Maize starch (6 – 9 percent moisture limit) — 150 grams
Gum. Acacia powder — 50 grams
Lactose — 800 grams
Talc — 20 grams
Magnesium stearate — 10 grams
Liquid paraffin — 15 grams
Water — approx. 100 m/s

METHOD OF PREPARATION

A. Granulation

1. Dry starch in a hot air oven at 40°C until moisture is reduced to a limit of 6 – 9 percent w/w.
2. Sieve each of the powders separately through a 40 mesh sieve.
3. Place the active ingredient in a planetary mixer and gradually add the lactose with continual stirring.
4. Add the starch and acacia, mixing for about 5 minutes after each addition, continue to mix for a further 20 minutes.
5. With constant mixing, add sufficient water until a suitable granule consistency is obtained (approximately 1 litre).
6. Pass damp granules through a rotary granulator fitted with a 10 mesh screen.
7. Dry the granules on trays at approximately 50°C.

B. Compression Mixture

1. Pass the dried granules through a 16 mesh screen.
2. Sieve sufficient dried granules on a 40 mesh. sieve to obtain approximately 500 grams of fines.
3. Mix the liquid paraffin with the fines and pass through a 20 mesh sieve.
4. Pass the talc and magnesium stearate through a 20 mesh sieve.
5. To the bulk of the granules in a planetary mixer add the lubricated fines, followed by the talc and magnesium stearate. Mix thoroughly for at least 10 minutes after each addition, and finally for 20 minutes.

C. Tableting

The mixture may be compressed into tablets on standard commercial rotary machines using the specified punches and limits of thickness.

D. Further Treatment

If required the tablets may be spray coated with any convenient known pharmaceutically accepted film lacquer or a coating of some other pharmaceutically acceptable material, for example, sugar.

EXAMPLE 51

Tablets were prepared as described in Example 50 containing only 400 grams of lactose.

EXAMPLE 52

Dry granules were prepared as described in Example 50. 500 mg of the granules were placed in gelatin capsules to provide an alternative oral unit dosage formulation.

EXAMPLE 53

Compounds of the invention were shown to possess anti-inflammatory activity by the "Mouse Ear Test," Brown et al., Nature, 202, 812–3 (1964).

The following table gives the activities of certain of these compounds.

| Compound of Example No. | Dosage in mgs required to reduce inflammation by 50% |
|---|---|
| 8 | 300 |
| 9 | 200 |
| 12 | 300 |
| 14 | 200 |
| 15 | 200 |
| 18 | 500 |
| 26 | 200 |
| 35 | 100 |
| 40 | 100 |
| 46 | 90 |
| Acetyl salicylic acid | 300 |
| Phenylbutazone | 300 |
| Indomethacin | 200 |
| Hydrocortisone | 10 |

EXAMPLE 54

The compound of Example 8 (X) was tested by the "Mouse Ear Test" method at various dosages; acetyl salicylic acid (Y) and hydrocortisone (Z) were used for comparison purposes.

| Compound | Dosage (mgs) | % Inhibition of Ear Weight Increase |
|---|---|---|
| X | 150 | 10 |
| X | 300 | 45 |
| X | 600 | 85 |
| Y | 100 | 15 |
| Y | 200 | 40 |
| Y | 400 | 40 |
| Y | 600 | 40 |
| Z | 1 | 70 |
| Z | 2 | 72 |
| Z | 4 | 76 |
| Z | 8 | 80 |

As may be seen from the above figures the compound of the present invention exhibits a characteristic generally associated with steroidal compounds, that is, the reduction in inflammation increase with dosage up to 85 percent or above (c.f. hydrocortisone) while acetylsalicylic acid produces a maximum reduction in inflammation of about 40 percent in this test and this cannot be further increased by increasing the dosage.

EXAMPLE 55

Compounds of the invention were shown to possess antiinflammatory activity in rats by means of the "Cotton Pellet Test" of Winter et al., J. Pharmcol, 148, 422–9 (1965). Compounds to show activity by this method included those of Examples 8,9 and 17 which were considerably more effective than acetyl salicylic acid.

EXAMPLE 56

Compounds of the invention were shown to possess anti-inflammatory activity by means of the "Rat Carrageenin Test" of Winter et al., J. Pharmcol., 148, 373 (1965). These compounds included those of Examples Nos 8, 9, 12 and 46.

What we claim is:

1. A pharmaceutical composition which comprises an anti-inflammatory amount of an imidazole derivative of the Formula (I):

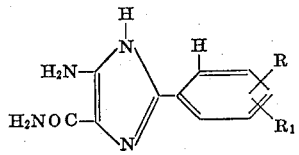

wherein R and $R_1$ are each hydrogen, halogen, nitro, trifluoromethyl, alkyl of one to four carbon atoms, methoxy, phenyl, lower alkoxy phenyl, hydroxy or amino; or a tautomer thereof, an acid addition salt thereof, a hydrate thereof or a hydrated acid addition salt thereof, in combination with a pharmaceutically acceptable diluent, carrier or excipient.

2. A pharmaceutical composition according to claim 1 wherein R and $R_1$ are each hydrogen, chloro, bromo, fluoro, lower alkyl, methoxy or trifluoromethyl.

3. A pharmaceutical composition according to claim 2 wherein one of R and $R_1$ is hydrogen and the other is hydrogen, fluoro, chloro, bromo, or methoxy.

4. A pharmaceutical composition according to claim 1 in oral administration form.

5. A pharmaceutical composition according to claim 4 in tablet form.

6. A pharmaceutical composition according to claim 4 in capsule form.

7. A pharmaceutical composition according to claim 1 in unit dosage form wherein each unit contains 1,000 g. of active ingredient.

8. A pharmaceutical composition according to claim 1 wherein the imidazole derivative is 5-amino-4-carboxamide-2-phenyl imidazole hydrochloride.

9. A pharmaceutical composition according to claim 1 wherein the imidazole derivative is 5(4)-amino-4(5)-amido-(4'-fluorophenyl) imidazole hydrochloride.

10. A method of effecting analgesia in humans and animals which comprises administering to a human or animal in need of such treatment a composition according to claim 1 which contains an analgesically effective amount of the active ingredient.

11. A method of providing anti-inflammatory relief to humans and animals which comprises administering to a human or animal in need of such treatment a composition according to claim 1 which contains an anti-inflammatory amount of the active ingredient.

* * * * *